April 27, 1965      P. L. FOX      3,180,214
PROJECTION SCREEN

Filed Aug. 28, 1962      6 Sheets-Sheet 1

INVENTOR.
PAUL L. FOX

BY

ATTORNEY

April 27, 1965 P. L. FOX 3,180,214
PROJECTION SCREEN
Filed Aug. 28, 1962 6 Sheets-Sheet 2

INVENTOR.
PAUL L. FOX
BY
ATTORNEY

April 27, 1965 P. L. FOX 3,180,214
PROJECTION SCREEN
Filed Aug. 28, 1962 6 Sheets-Sheet 3
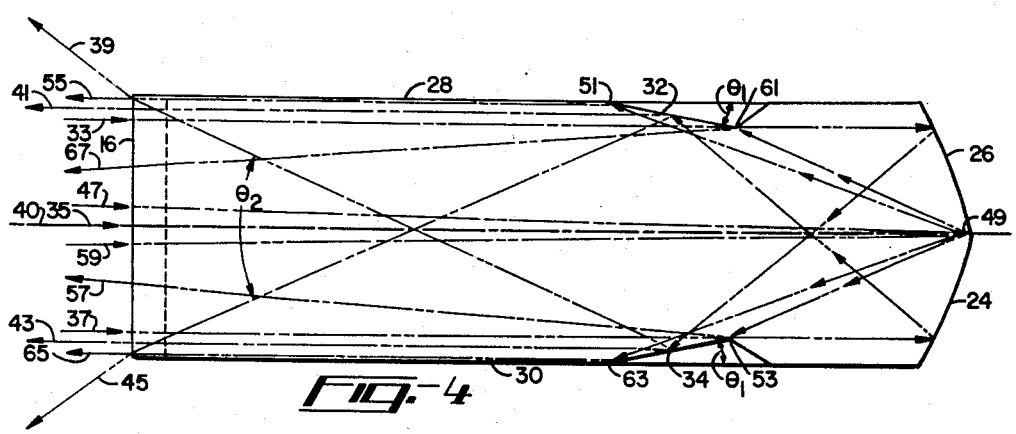
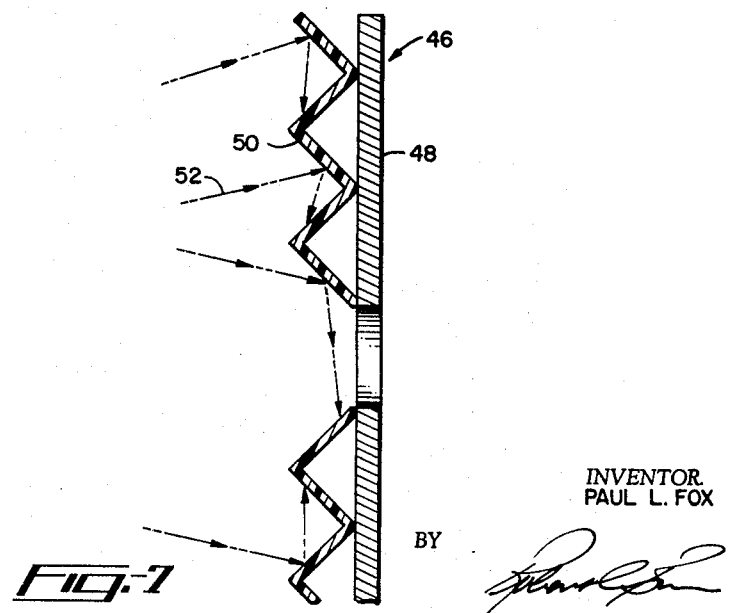
INVENTOR.
PAUL L. FOX
BY
ATTORNEY

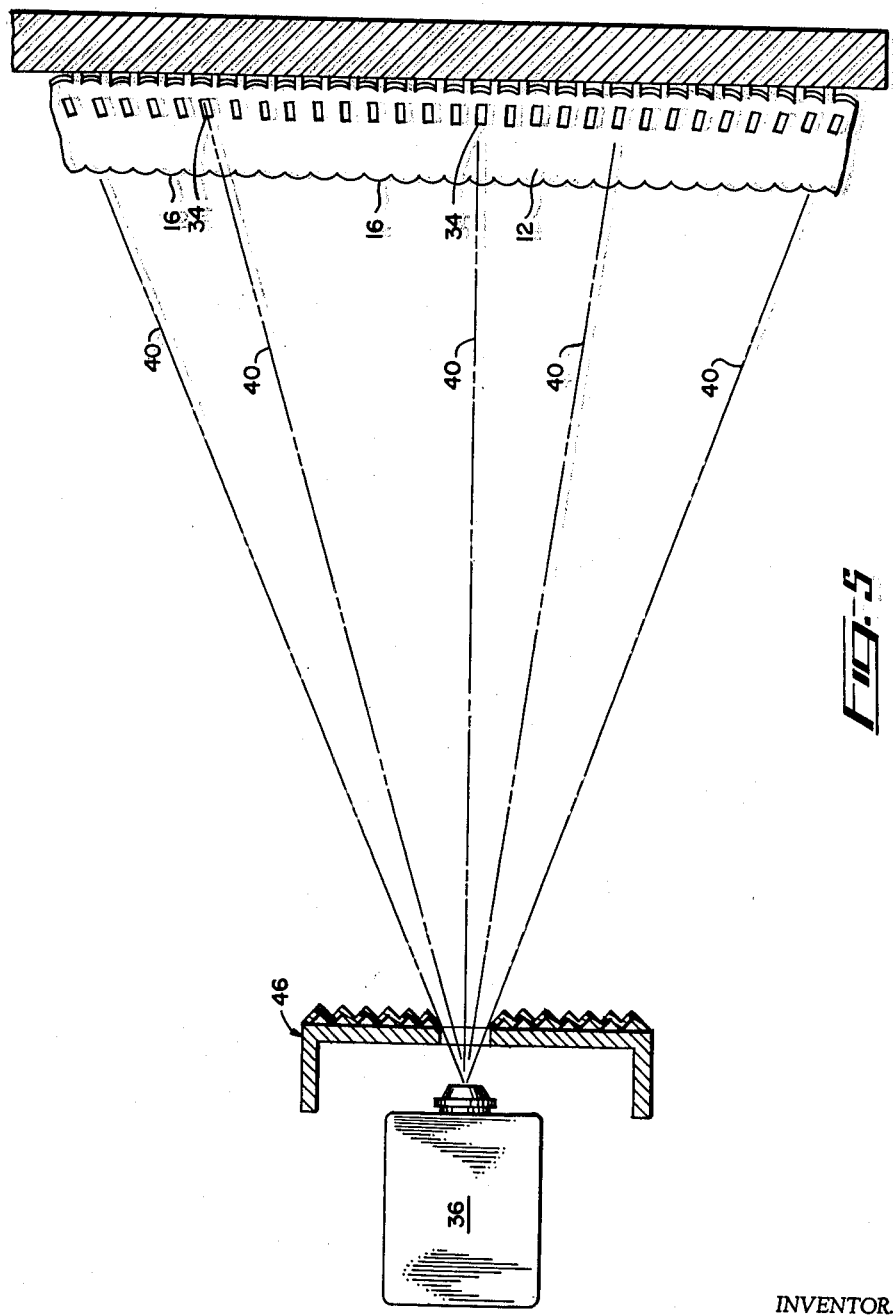

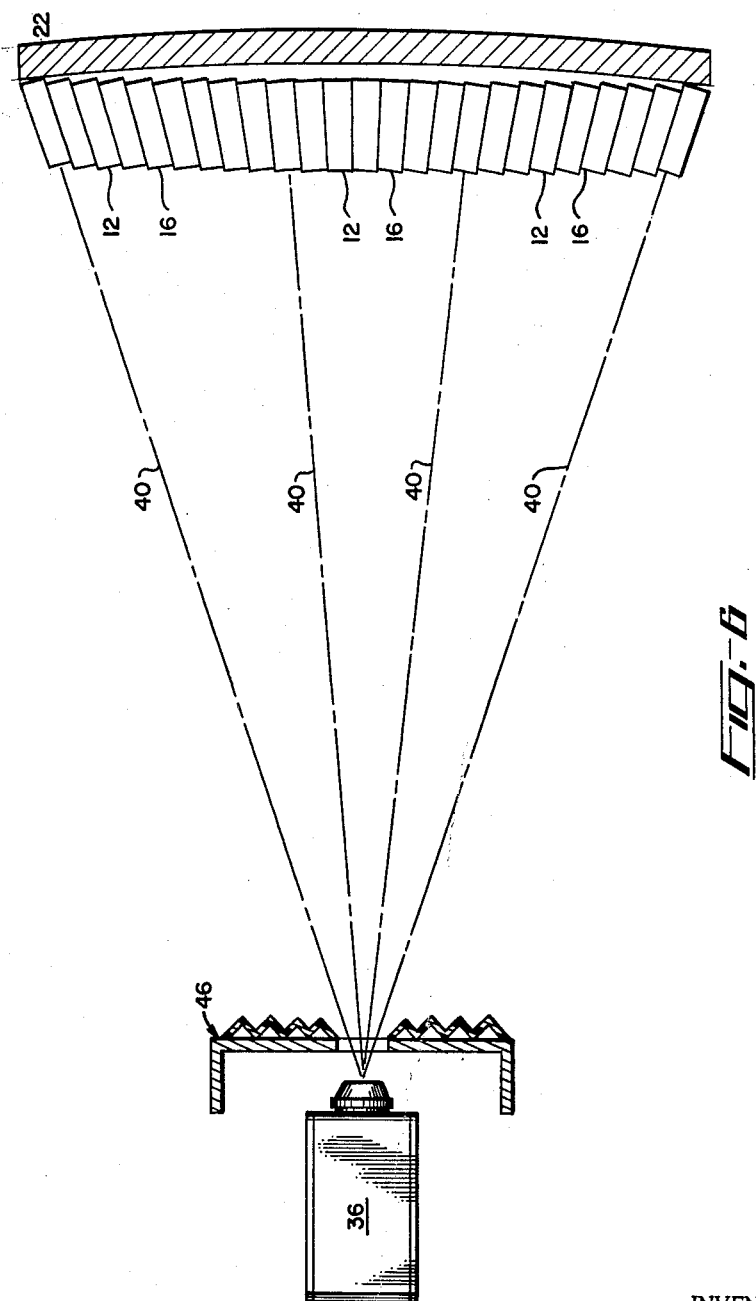

April 27, 1965    P. L. FOX    3,180,214
PROJECTION SCREEN
Filed Aug. 28, 1962    6 Sheets-Sheet 6
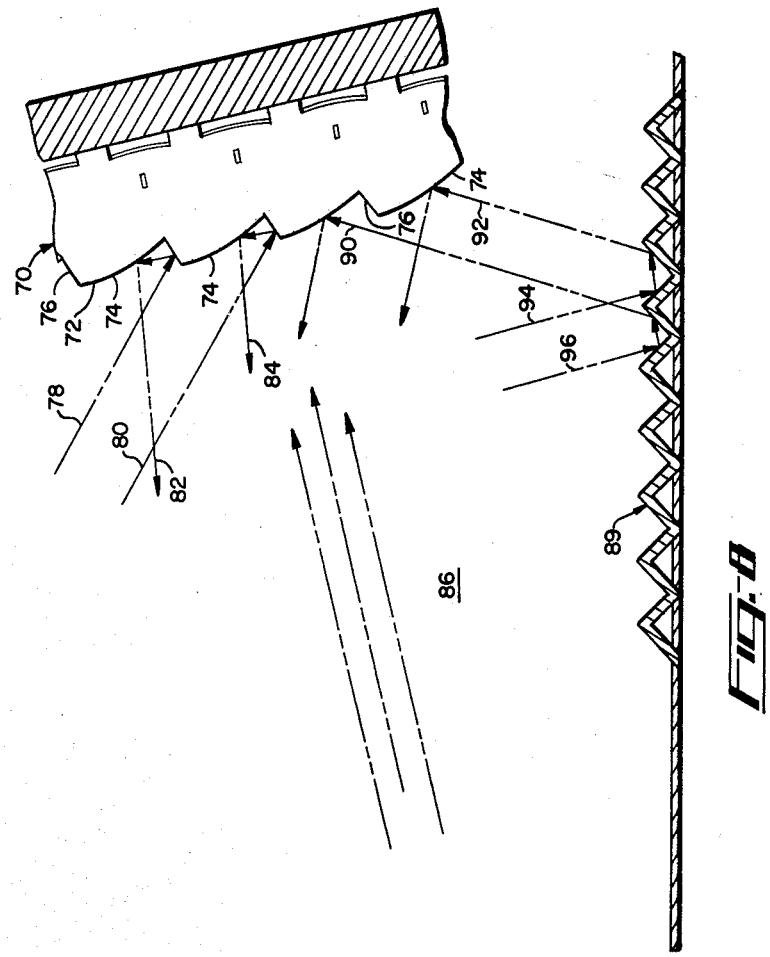
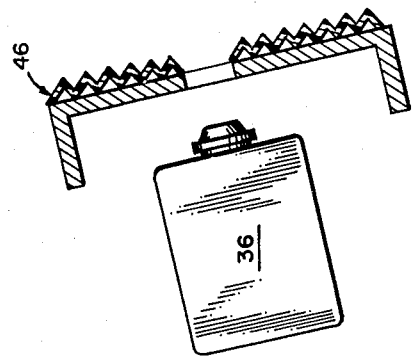
INVENTOR.
PAUL L. FOX
BY
*ATTORNEY*

United States Patent Office 3,180,214
Patented Apr. 27, 1965

3,180,214
PROJECTION SCREEN
Paul L. Fox, Whittier, Calif., assignor to Aerojet-General
Corporation, Azusa, Calif., a corporation of Ohio
Filed Aug. 28, 1962, Ser. No. 219,830
15 Claims. (Cl. 88—28.9)

This invention relates to optical projection viewing screens and more particularly to an improved viewing screen of the front projection type.

Heretofore, projection screens of the reflecting or front projection type have been restricted to use in darkened or dimly lighted surroundings. This is because the relatively dim image produced by most projectors does not provide sufficient contrast with daylight to be readily visible. This condition could be overcome by increasing the actual intensity of the projected image on the viewing screen. However, this approach is not practical because this would require an increase in temperature (and power consumption) of the projection light source which in turn delivers more heat to the film and thus complicates the cooling apparatus. Alternatively, the apparent intensity of the image upon the screen could be increased by providing a screen which reflects only a small quantity of the ambient light into the viewing space. If this is done, the contrast of the image on the screen would be substantially increased causing the projected image to appear brighter. This would be just as effective as an increase in actual intensity for increasing visibility.

Various techniques and methods for partially absorbing or shielding ambient light from reflection by projection screens have been known. These techniques and methods involve the use of lenticulated light directing surfaces to form the viewing screens. However, these prior screens have been deficient in one or more of the following attributes of a practical screen; (1) adequate viewing space angle; (2) attenuation of ambient light; (3) simplicity of overall structure or system; (4) effectiveness in increasing contrast without increasing projector power.

What is needed, therefore, and comprises a principal object of this invention is to provide an inexpensive, simple, yet highly efficient reflection type projection viewing screen which is adapted to be used in conjunction with conventional optical projectors to provide observers thereof with clearly discernible projected images without requiring the screen and the observers to be in a darkened region.

The invention in its broadest aspect comprises a screen formed from a plurality of parallel strips of transparent material in abutting relationship. The strips are shaped so they comprise a series of vertically disposed lenticular cells. The individual cells forming the strip are each provided with a rear reflecting surface and a small internally reflecting element at the side of the cell. This side reflecting element is at the focus of the rear reflecting surface and is positioned so that light entering the front surface of the cell along the axis of the cell and striking the rear reflecting surface will be reflected to the side reflecting element. All other portions of the sides of the individual cells are covered with a light absorbing material.

With this arrangement, light entering the cells at an angle to the axis of the cell greater than a predetermined angle will strike the sides of the cell and be absorbed. Consequently, a large portion of the ambient light striking the screen will be absorbed, and only light from a projector which is aimed along the axis of the individual cells will be reflected from the rear surface and focused on the side reflecting element as a tiny point image of a portion of the picture being projected. With this arrangement, the cells composing the screen cooperate to form the completed picture and by substantially eliminating reflected ambient light, the contrast of the picture will be substantially increased.

This and other objects of this invention will become more apparent and better understood in the light of the accompanying specification and drawings wherein:

FIGURE 4 is a transverse sectional view taken along line 4—4 in FIG. 2 and showing the path of light entering a single individual cell and being reflected therefrom;

FIGURE 5 is an elevational view of the screen constructed according to the principles of this invention in association with a projector;

FIGURE 6 is a plan view of a projection screen constructed according to this invention in association with a projector;

FIGURE 7 is a side sectional view of a portion of a light absorbing screen designed to be positioned around the projector lens to prevent ambient light from the region around the projector from being reflected toward the screen; and FIGURE 8 is a side elevational view of a modified screen constructed according to the principles of this invention.

Figure 1:
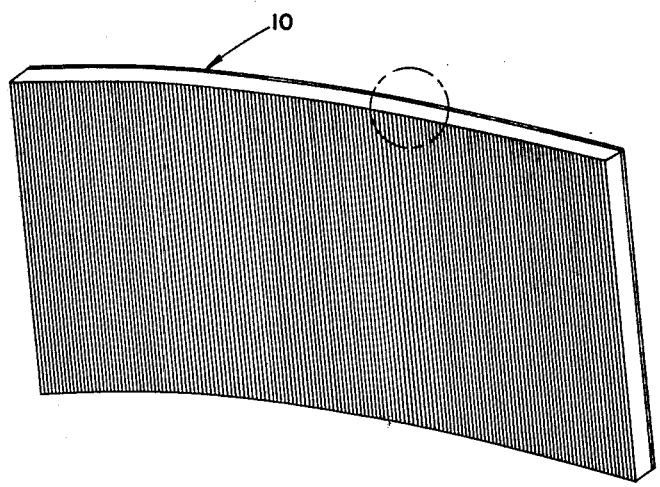
FIGURE 1 is a perspective view of the complete screen constructed according to the principles of this invention.
Figure 2:
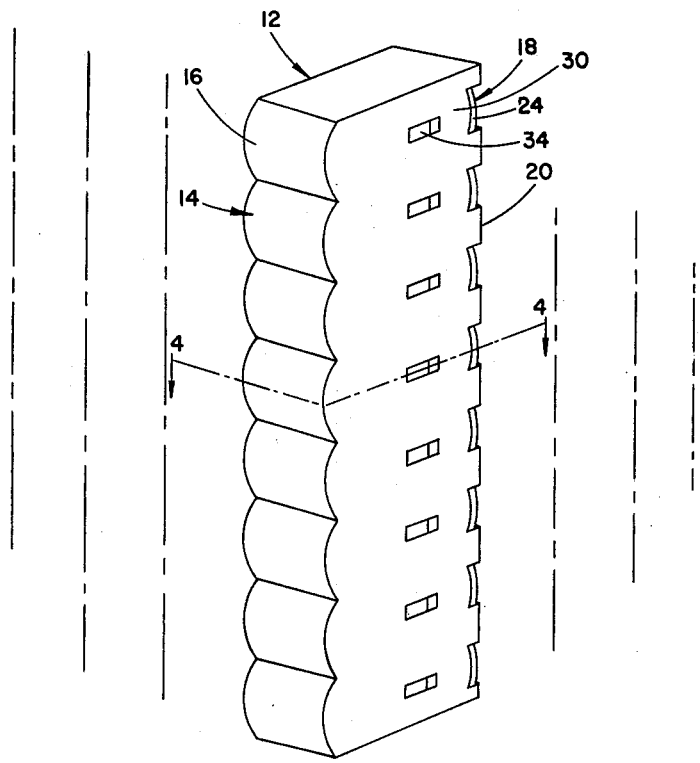
FIGURE 2 is a greatly enlarged fragmentary perspective view of a single strip of cells, taken from the circle shown in phantom lines in the screen of FIGURE 1, adjacent strips of cells being illustrated in phantom lines.
Figure 2:

Referring now to FIGURE 1 of the drawings, a perspective view of the projection screen constructed according to the principles of this invention is indicated generally by the reference numeral 10. The screen is composed of a plurality of parallel and abutting strips of light transmitting material such as glass or plexiglass and are indicated generally by the reference numeral 12 (see FIGURE 2). The strips 12 are molded so that the front surfaces 14 of each strip comprise a plurality of individual vertically arranged cylindrical surfaces 16 for reasons to be described below. The rear surfaces 18 of the individual strips comprise a series of uniformly vertically spaced planar mounting surfaces 20 (see FIGURE 3). These planar mounting surfaces 20 are adapted to be attached by glueing or by other suitable means to a rear backing member or support 22. The surfaces 24 and 26 (see FIGURE 4) intermediate the planar mounting surfaces 20 are spherical reflecting or image forming surfaces, for reasons to become apparent below.

Figure 3:
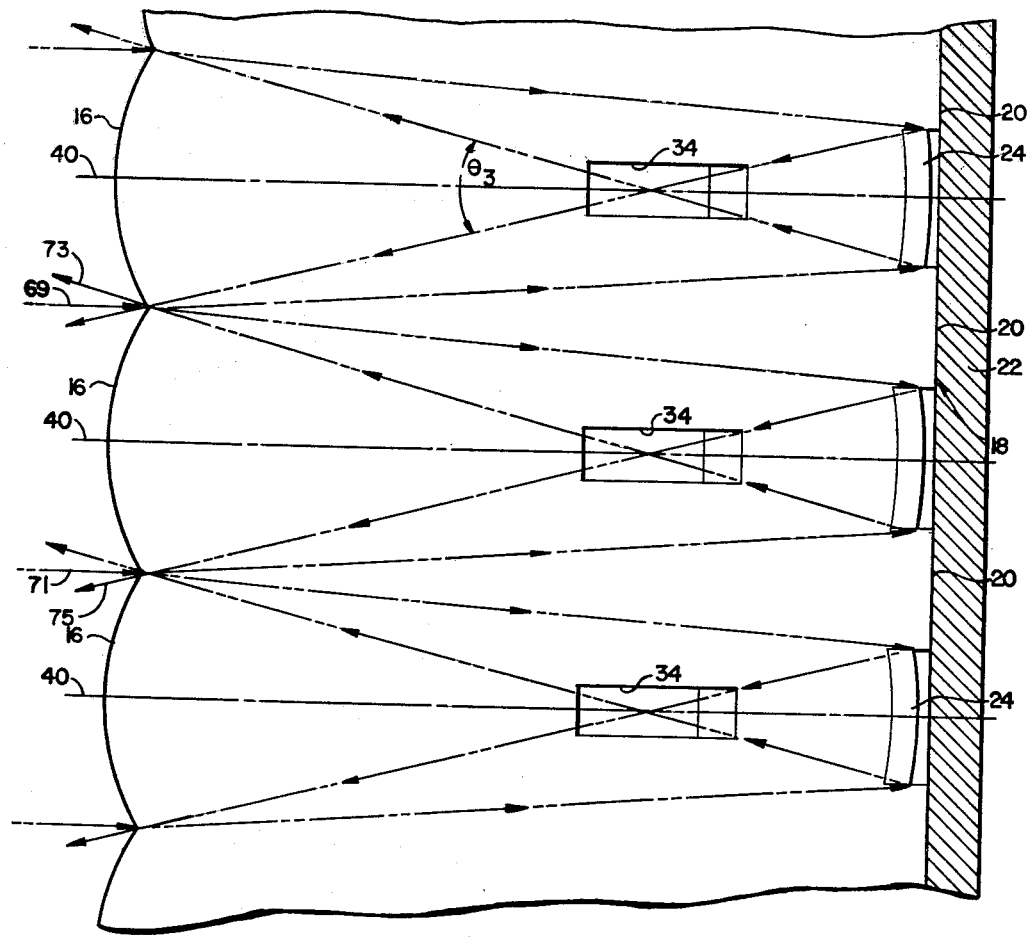
FIGURE 3 is a side elevational view of a portion of a single strip of cells showing the disposition of the individual cells therein and the path of light from the projector entering the individual cells and being reflected therefrom into a viewing area.

A series of uniformly vertically spaced internally molded reflecting elements 32 and 34 are formed in the opposed sides 28 and 30 of the strips 12 (see FIGURES 3 and 4). These internal reflecting elements 32 and 34 are positioned along the boundary of the bundle of rays entering the cell to avoid obscuring them and are at the optical focus of the spherical reflecting surfaces 24 and 26 respectively, whereby light entering the strips in a direction parallel to the sides 28 and 30 and falling on one of the rear reflecting surfaces 24 or 26 is reflected to a focal point on the internal reflecting elements 32 or 34. In addition, the remaining portions of sides 28 and 30 of each of the strips 12 are covered with a black light-absorbing material.

As best seen in FIGURES 5 and 6, the individual strips 12 composing the screen are positioned so their front surfaces 16 are disposed generally perpendicular to light from projector 36. With this arrangement and with the rear surfaces 24 and 26 and the internal reflecting elements 32 and 34 positioned as shown in FIGURE 4, light from projector 36 directed against the screen will enter the front cylindrical surfaces 16 in a direction parallel to the sides of the strips.

Each individual cell, which together combine to form a strip 12, includes the front cylindrical surface 16, symmetrically disposed rear image forming reflecting surfaces or mirrors 24 and 26, and the associated reflecting elements 32 and 34 at the focus of the reflecting surfaces. As best seen in FIGURES 4 and 5, the individual cells composing each strip 12 are disposed so that their axes 40 (through the center of the cylindrical front face and the center 49 between the rear image forming reflecting surfaces 24 and 26) are coincident with the axes of the respective light beams from the projector entering each cell.

The light striking the front cylindrical surface 16 will be refracted and converge toward the image forming mirrors 24 and 26. This permits the mirrors 24 and 26 to be reduced in size in the vertical direction and disposed in a vertically spaced relation along the strip so that the mounting surfaces 20 may be formed therebetween. In addition, the field of view of each cell is narrowed to 50% vertically to provide a gain in image brightness without corresponding reduction in cell height and attendant increase in fabrication difficulty.

Light rays entering the cell in the general direction of the cell axis 40 and arriving at the mirrors 24 and 26 will be reflected and focused on the side reflecting elements 32 and 34, and from there to the front of the cell in a diverging bundle. In exiting from the cell the bundle is further diverged by refraction and leaves in the directions indicated by arrows 39, 41, 43, and 45, and all directions intermediate between these extremes.

Light rays entering the cell at an angle to the axis 40 which is greater than 3° (this limit is set by the size of elements 32 and 34) will either directly strike the black absorbing sides 28 and 30 of the cell or else they will first strike the rear reflecting surfaces 24 and 26 and will then be reflected to the black absorbing portions of the sides of the cell. In either case, all such light is absorbed.

By way of specific example, the strips 12 may be .032 inch thick and .112 inch wide. The radius of curvature of the rear image forming surfaces 24 and 26 would be .072 inch and the radius of curvature of the front cylindrical surface 16 would be .080 inch. In the particular embodiment shown, the internally molded reflecting elements 32 and 34 are inclined reflecting surfaces .016 inch in length and inclined at an angle $\theta_1$ which is 10.5° to the sides 28 and 30 of the strips (see FIGURE 4).

With this arrangement, projected light indicated by arrows 33, 35, and 37 entering each cell would exit the cell in such a way that the azimuth angle $\theta_2$ between the exiting light beams 39 and 45 would be 70° whereby the screen would have a 70° horizontal field of view. Similarly, as shown in FIGURE 3, the elevational rays 69 and 71 entering a cell from the projector 36 would exit the cell as in light rays 73 and 75 at an angle $\theta_3$, which, in the embodiment shown, in around 24°. Consequently, the lenticular screen would have a 24° angle vertical field of view.

The dimensions of the reflecting elements 32 and 34 are limited by projector placement tolerance. It is noted that if a projector 36 has a three-inch objective lens and is at a distance of 15′ from the screen, the size of the image reflected would be approximately .007 of an inch in diameter. This means that the side reflecting elements 32 and 34 are larger than necessary from strictly optical requirements. However, to avoid critical placement of the projector, it is impractical to reduce the internal reflecting elements 32 and 34 to the size of the image. As a consequence, ambient light originating from the region around the projector can enter the individual cells and will be reflected therefrom to the internal reflecting element and from there out of the cells, thereby decreasing the contrast. In practice, if the cells have the above-described dimensions, ambient light can enter the cells through a 3° conical angle around the axis 40 of the cells, as described above.

To illustrate this, as shown in FIGURE 4, light entering the cell above axis 40 at an angle of 3° from the axis 40, and indicated by the arrow 47 and which strikes the junction 49 of the reflecting surfaces 24 and 26, would be reflected to extreme points 51 and 53 on reflecting elements 32 and 34. This light may be reflected off these elements so it leaves the cell in the direction indicated by arrows 55 and 57. It is apparent, however, that ambient light entering the cell at an angle greater than 3° and striking the rear reflecting surfaces 24 and 26 would miss the side reflecting elements 32 and 34 and would therefore be absorbed. Similarly, light entering the cell below axis 40 at an angle of 3°, as indicated by arrow 59 and which strikes the junction 49 of the rear reflecting surfaces 24 and 26 would be reflected to the extreme points 61 and 63 of the reflecting elements 32 and 34. This light could leave the cell in the direction indicated by arrows 65 and 67. Thus, as stated above, only ambient light from within 3° of the cell axis would be reflected out of the cell and into the viewing space. For the remaining 99% of the ambient illumination which enters the cell, that cell acts as an effective trap.

In order to gain the last bit of efficiency for the system, a light shield indicated generally by the reference numeral 46 is positioned in front of the projector 36 to absorb ambient light originating back of and in front of projector 36. With this arrangement, ambient light which could otherwise enter the cell through the 3° conical angle around the axis 40 of the cell is effectively eliminated.

The light shield 46 comprises a backing plate 48 with a front surface 50 (see FIGURE 7). The surface 50 is formed from black light-absorbing material with a 90° zig-zag surface. With this arrangement, light falling on the surface 50, and specularly reflected as indicated by the arrow 52, will be reflected at least twice so that substantially all light will be absorbed and very little light would be reflected. It is apparent from FIGURES 5, 6, and 7 that the projected light from projector 36 passes through an opening in the light shield 46. Consequently, the light shield effectively prevents ambient light within a 3° conical angle around the axis of the cells from entering the cells.

In order for the lenticular screen to operate properly it is necessary for the projected light to enter the cells in a direction parallel to the axis 40 of the cells. This means that the projected light beam must be transverse to the front surface 14 of the screen. Consequently, if a projector and the screen cannot be at the same level, the screen must be inclined to the vertical. A modification of a lenticular screen illustrating this is shown in FIGURE 8, where the modified lenticular screen indicated generally by the reference numeral 70 operates generally like the screen 10 and the light cells shown in FIGURES 3 and 4. However, the front surface 72 of the light cells comprising screen 70 is saw-toothed in shape and comprises downwardly convex cylindrical surfaces 74, each terminating in a generally planar top surface 76.

With this arrangement, ambient light striking the screen which would otherwise be reflected off the transparent front surface of the cells, indicated by arrows 78 and 80, would be reflected twice before entering the viewing area, as indicated by arrows 82 and 84. This multiple reflection off the transparent surfaces permits only a small fraction of this ambient light to enter the viewing region 86.

Ambient light reflected from a surface below the screen 70 could be reflected into the viewing region 86 by only a single reflection at the screen, as indicated by arrows 90 and 92. To reduce this effect, the surface may be covered with a mat-like material 89 having a light absorbing saw-toothed shape. With this arrangement, ambient light falling thereon would be reflected twice before it could reach the viewing screen, as indicated by arrows 94 and 96. This arrangement would substantially prevent ambient light reflected from the surface from entering the viewing area, thereby depressing the picture contrast.

For the reasons described above, substantially the only light directed against the screen 70 and reflected back into the viewing region 86 comes from the projector 36. Consequently, the picture projected on the screen would have good contrast, permitting the picture to be viewed under conditions of high ambient light.

It is to be understood that the forms of the invention herewith shown and described are to be taken as preferred examples of the same, and that various changes in the shape, size, and arrangement of the parts may be resorted to without departing from the spirit of this invention or the scope of the claims.

I claim:

1. A projection screen of the class described comprising a support, a plurality of strips of transparent material mounted on said support in side-by-side abutting relationship, each strip having parallel sides and front and rear surfaces, a plurality of linearly spaced image forming elements formed on the rear surfaces of said strips, a plurality of linearly spaced reflecting elements mounted in fixed relationship to the sides of the strips, said reflecting elements small in comparison to the image forming elements, each reflecting element positioned at the focus of an image forming element, the parallel sides of the strips covered with a light absorbing material, the image forming elements, and the associated reflecting elements positioned so that light entering the strips generally transverse to the front surfaces thereof and parallel to the parallel sides of the strips is focused by the image forming elements on the reflecting elements, from where the light is reflected from the screen to a viewing area, and light entering the strips at an inclined angle to the parallel sides of the strips or not generally transverse to the front surfaces thereof encounters the light absorbing material on the sides of the strips.

2. A projection screen of the class described comprising a support, a plurality of strips of transparent material mounted on said support in side-by-side abutting relationship, each strip having parallel sides and front and rear surfaces, a plurality of linearly spaced image forming elements formed on the rear surfaces of said strips, a plurality of linearly spaced reflecting elements mounted on at least one side of said strips, said reflecting elements small in comparison to the image forming elements, each reflecting element positioned at the focus of an associated image forming element, the parallel sides of the strips except for the reflecting elements covered with a light absorbing material, the image forming elements and the associated reflecting elements positioned so that light entering the strips generally transverse to the front surfaces thereof and parallel to the parallel sides is focused by the image forming elements on the associated reflecting elements from where the light is reflected out of the front surfaces of the strips and light entering the strips at an inclined angle to the parallel sides of the strips and not generally transverse to the front surfaces thereof encounters the light absorbing material on the sides of the strips.

3. A projection screen of the class described comprising a support, a plurality of strips of transparent material mounted on said support in side-by-side abutting relationship, each strip having parallel sides and front and rear surfaces, a plurality of linearly spaced image forming elements formed on the rear surface of each strip, a plurality of linearly spaced reflecting elements mounted on at least one side of each strip, said reflecting elements small in comparison to the image forming elements, each reflecting element positioned at the focus of an associated image forming element, the parallel sides of the strips except for the reflecting elements covered with a light absorbing material, the portion of the front surface of each strip opposite an image forming element, the image forming element and the reflecting elements constituting a cell whereby each strip comprises a plurality of linearly arranged cells, the image forming elements and the associated reflecting elements positioned so that light entering the front surface of a cell and generally transverse with respect thereto and generally parallel to the sides of the cell, may be reflected by the image forming element to the reflecting element from where the light is reflected out of the front surface of the cell, and light entering the cell at an inclined angle to the sides of the cell or not generally transverse to the front surface of the cell encounters the light absorbing material on the sides of the cell.

4. A projection screen of the class described comprising a support, a plurality of strips of transparent material mounted on said support in side-by-side abutting relationship, each strip having parallel sides and front and rear surfaces, a plurality of linearly spaced image forming elements formed on the rear surface of each strip, a plurality of linearly spaced reflecting elements mounted on at least one side of each strip, said reflecting elements small in comparison to the image forming elements, each reflecting element positioned at the focus of an associated image forming element, the parallel sides of the strips except for the reflecting elements covered with a light absorbing material, the portion of the front surface of each strip opposite an image forming element, the image forming element and the reflecting elements constituting a cell whereby each strip comprises a plurality of linearly arranged cells, the front surface of each cell being cylindrical in shape and functioning to cause the light projected to the screen to converge on the image forming element, whereby a vertical separation may be maintained between the image forming elements and the field of view of each cell is narrowed vertically to increase the brightness of the image without reducing cell size or the size of the reflecting elements, the image forming elements and the associated reflecting elements positioned so that light entering a cell generally transverse to the cylindrical front surface and parallel to the parallel sides may be reflected by the image forming elements to the reflecting elements from where the light is reflected out of the front surface of the cell, and light entering the cell at an inclined angle to the sides of the cell or not generally transverse to the cylindrical front surface of the cell encounters the light absorbing material on the sides of the cell.

5. The projection screen described in claim 4 wherein planar mounting surfaces are formed on the rear surface of each strip between the spaced image forming elements.

6. A projection screen of the class described comprising a support, a plurality of strips of transparent material mounted on said support in side-by-side abutting relationship, each strip having parallel sides and front and rear surfaces, a plurality of linearly spaced pairs of image forming elements formed on the rear surfaces of said strips, the image forming elements in each pair abutting against each other midway between said parallel sides, a plurality of linearly spaced reflecting elements mounted on each side of said strips, said reflecting elements small in comparison to the pairs of image forming elements, each reflecting element associated with and at the focus of one of the image forming elements in the pair of image forming elements adjacent the opposite side of the strip, the parallel sides of the strips except for the reflecting elements covered with a light absorbing material, the image forming elements and the associated reflecting elements positioned so that light entering a strip generally transverse to the front surface thereof and parallel to the parallel sides is reflected by the pair of image forming elements to the associated reflecting elements on each side of the strip from where the light is reflected out of the front surface of the strip, and light entering the strip at an inclined angle to the parallel sides or not generally transverse to the front surface encounters the light absorbing material on the sides of the strip.

7. A projection screen of the class described comprising a support, a plurality of strips of transparent material mounted on said support in side-by-side relationship, each strip having parallel sides and front and rear surfaces, a plurality of linearly spaced pairs of image forming elements formed on the rear surfaces of said strips, a plurality of linearly spaced reflecting elements formed on each side of the strips, each reflecting element small in comparison to the pair of image forming elements, image forming elements in each pair positioned so adjacent edges thereof abut each other at a point intermediate said parallel sides, each reflecting element associated with the image forming element in a pair of image forming elements adjacent the opposite side of said strip and positioned at the focus thereof, the parallel sides of the strips except for the reflecting elements covered with a light absorbing material, the portion of the front surface of the strip opposite each pair of image forming elements cylindrical in shape for causing the light directed against the front surface of the strip to converge on the pairs of image forming elements whereby a vertical separation may be maintained between the pairs of image forming elements on the rear surface of the strip, each cylindrical front surface of a strip opposite a pair of image forming elements, the pair of image forming elements and the associated reflecting elements constituting a cell, whereby each strip comprises a plurality of linearly arranged cells, the pairs of image forming elements and the associated reflecting elements positioned so that light entering the cylindrical front surface of the cell generally transverse with respect thereto and generally parallel to the sides of the cell is reflected by the pair of image forming elements to the associated reflecting elements from where the light is reflected out of the front surface of the cell, and light entering the cell at an inclined angle to the sides of the cell or not generally transverse to the front surface of the cell encounters the light absorbing material on the sides of the cell.

8. The projection screen described in claim 7 wherein planar mounting surfaces are formed on the rear surface of each strip between pairs of image forming elements.

9. A projection screen of the class described comprising a curved support, a plurality of strips of transparent material mounted on said support in side-by-side relationship, each strip having parallel sides and front and rear surfaces, said strips positioned so their rear surfaces engage said curved support and the front surfaces are disposed outwardly therefrom, a plurality of linearly spaced image forming elements formed on the rear surface of each strip, a plurality of linearly spaced reflecting elements mounted on at least one side of each strip, said reflecting elements small in comparison to the image forming elements, each reflecting element positioned at the focus of an associated image forming element, the parallel sides of the strips except for the reflecting elements covered with a light absorbing material, the portion of the front surface of each strip opposite an image forming element, the image forming element and the associated reflecting element constituting a cell whereby each strip comprises a plurality of linearly arranged cells, the image forming element and the associated reflecting element positioned so that light entering the front surface of each cell generally transverse with respect thereto and generally parallel to the sides thereof may be focused by the image forming element on the reflecting element from where the light is reflected out of the front surface of the cell, and light entering the cell at on inclined angle to the sides or not generally transverse to the front surface of the cell encounters the light absorbing material on the sides of the cell.

10. A display apparatus of the class described comprising in combination a projector and projection screen, said projection screen comprising a support, a plurality of strips of transparent material mounted on said support in side-by-side abutting relationship, each strip having parallel sides and front and rear surfaces, a plurality of linearly spaced image forming elements formed on the rear surfaces of said strips, a plurality of linearly spaced reflecting elements mounted on at least one side of said strips, said reflecting elements small in comparison to the image forming elements, each reflecting element positioned at the focus of an associated image forming element, the parallel sides of the strips except for the reflecting elements covered with a light absorbing material the image forming elements and the associated reflecting elements positioned so that light from the projector entering a strip generally transverse to the front surface thereof and parallel to the parallel sides may be reflected by the image forming elements to the associated reflecting elements from where the light is reflected out of the front surface of the strip, and light entering the strip at an inclined angle greater than a predetermined angle with respect to the parallel sides of the strip or not generally transverse to the front surface of the strip encounters the light absorbing material on the sides of the strip whereby only light directed to the screen from the projector and ambient light within a predetermined conical angle around the projector will be reflected back out of the strips and substantially all of the remaining ambient light striking the strips will be absorbed, and means adjacent the projector for preventing the direction of ambient light within said predetermined conical angle around the projector whereby substantially the only light reflected by the projection screen originates from the projector to said screen.

11. A display system of the class described comprising in combination a projector and a projection screen, said projection screen comprising a support, a plurality of strips of transparent material mounted on said support in side-by-side abutting relationship, each strip having parallel sides and front and rear surfaces, a plurality of pairs of linearly spaced image forming elements formed on the rear surfaces of said strips, a plurality of linearly spaced reflecting elements mounted on each side of each strip, said reflecting elements small in comparison to the pairs of image forming elements, each reflecting element associated with the image forming element in a pair of image forming elements adjacent the opposite side of the strip and positioned at the focus thereof, the parallel sides of the strips except for the reflecting elements covered with a light absorbing material, the pairs of image forming elements and the associated reflecting elements positioned so that light entering each strip generally transverse to the front surface thereof and parallel to the parallel sides is reflected by the image forming elements to the reflecting elements from where the light is reflected out of the front surface of the strip, and light entering the strip at an inclined angle to the parallel sides or not generally transverse to the front surface thereof encounters the light absorbing material on the sides of the strip whereby only light directed to the screen in a direction generally transverse to the front surfaces of the strips and parallel to the sides of the strips will be reflected out of the strips and substantially all of the remaining ambient light striking the strips forming the screen will be absorbed.

12. A display apparatus of the class described comprising in combination a projector and a projection screen, said projection screen comprising a curved support, a plurality of strips of transparent material mounted on said support in side-by-side abutting relationship, each strip having parallel sides and front and rear surfaces, said strips positioned so the rear surfaces engage said curved support and the front surfaces are disposed outwardly therefrom, a plurality of linearly spaced pairs of image forming mirrors formed on the rear surface of each strip, a plurality of linearly spaced reflecting elements mounted on each side of each strip, said reflecting elements small in comparison to the image forming mirrors, each reflecting element positioned at the focus of an associated mirror, the parallel sides of the strips except for the reflected elements covered with a light absorbing material, the portion of the front surface of each strip opposite a pair of rear image forming mirrors cylindrical in shape, each pair of image forming mirrors, the opposite cylindrical front portion of the strip corresponding thereto and the reflecting elements associated with the pair of image forming mirrors constituting a cell whereby each strip comprises a plurality of linearly arranged cells, each pair of mirrors positioned so they abut against each other, the pair of image forming mirrors and the associated reflecting elements on each side of a cell positioned so that light entering the front surface of the cell generally transverse with respect thereto and generally parallel to the sides of the cell is reflected by the pair of image forming mirrors to the reflecting elements from where the light is reflected out of the front surface of the cell, and light entering the cell at an inclined angle greater than a predetermined angle to the sides of the cell or not generally transverse to the cylindrical front surface of the cell encounters light absorbing material on the sides of the cell, said projector positioned so that projected light enters all strips in a direction generally transverse to the front surfaces of the strips and parallel to the parallel sides, whereby the projected light will be reflected from the screen, and substantially all of the remaining ambient light striking the screen will be absorbed.

13. A projection screen of the class described comprising in combination a vertically inclined support, a plurality of strips of transparent material mounted on said support in side-by-side abutting relationship, each strip having parallel sides and front and rear surfaces, a plurality of linearly spaced pairs of image forming mirrors formed on the rear surface of each strip, a plurality of linearly spaced reflecting elements mounted on each side of each strip, said reflecting elements small in comparison to the image forming mirrors, ecah reflecting element positioned at the focus of an associated image forming mirror, the parallel sides of each strip except for the reflecting elements covered with a light absorbing material, a plurality of linearly spaced cylindrical surfaces formed on the front surface of each strip, the upper portion of each cylindrical surface terminating in an inclined planar surface to provide the front surface of the screen with a saw-tooth shape, the portion of the front surface of the strip including a cylindrical portion and a connected planar portion opposite each pair of image forming mirrors, the pair of image forming mirrors corresponding thereto and the reflecting elements associated with the pair of image forming mirrors constituting a cell whereby each strip comprises a plurality of vertically inclined linearly arranged cells, the image forming mirrors and associated reflecting elements positioned so that light entering the front surface of a cell generally transverse with respect thereto and generally parallel to the sides of the cell is reflected by the image forming mirrors to the reflecting elements from where the light is reflected out of the front surface of the cell, and light entering the cell at an inclined angle to the sides of the cell greater than a predetermined angle or not generally transverse to the front surface of the cell encounters the light absorbing material on the sides of the cell and is absorbed or else undergoes multiple reflection at the front surface of the cell and is attenuated.

14. A display apparatus of the class described comprising in combination a projector and a projection screen, said projection screen comprising a vertically inclined support, a plurality of strips of transparent material mounted on said support in side-by-side abutting relationship, each strip having parallel sides and front and rear surfaces, a plurality of linearly spaced pairs of image forming mirrors formed on the rear surface of each strip, a plurality of linearly spaced reflecting elements formed on each side of said strips, said reflecting elements small in comparison to the pairs of image forming mirrors, each reflecting element positioned at the focus of an associated image forming mirror, the parallel sides of the strips except for the reflecting elements covered with a light absorbing material, a plurality of linearly spaced cylindrical surfaces formed on the front surface of each strip, each cylindrical surface terminating in an upwardly inclined planar surface to provide the front surface of each strip with a saw-tooth shape, the cylindrical portion of the front surface of the strip and the connected upwardly inclined planar portion opposite each pair of image forming mirrors, the pair of image forming mirrors and the associated reflecting elements constituting a cell, whereby each strip comprises a plurality of linearly arranged cells, the pair of image forming mirrors and the associated reflecting elements positioned so that light entering the front surface of a cell generally transverse with respect thereto and generally parallel to the sides of the cell is reflected by the pair of image forming mirrors to the associated reflecting elements from where the light is reflected out of the front surface of the cell and light entering the cell at an inclined angle to the sides of the cell greater than a predetermined angle or not generally transverse to the front surface of the cell encounters the light absorbing material on the sides of the cell and is absorbed or else undergoes multiple reflection at the front surface of the cell and is attenuated, said projector positioned so the projected light enters all cells in a direction generally transverse to the front surfaces thereof and parallel to the sides of the cells whereby the projected light will be reflected from the screen and substantially all the ambient light striking the screen will be absorbed.

15. A projection screen of the class described comprising a plurality of strips of transparent material mounted in side-by-side abutting relationship, each strip having parallel sides and front and rear surfaces, a plurality of linearly arranged image forming elements formed on the rear surfaces of said strips, a plurality of linearly spaced reflecting elements mounted on at least one side of said strips, said reflecting elements being small in comparison to the image forming elements, each reflecting element being positioned at the focus of an image forming element, the parallel sides of the strips being covered with a light absorbing material, the image forming elements and the associated reflecting elements being positioned so that light entering the strips generally transverse to the front surfaces thereof and parallel to the parallel sides of the strips is focused by the image forming elements on the reflecting elements from where the light is reflected from the screen to a viewing area, and light entering the strips at an inclined angle to the parallel sides of the strips in a direction other than generally transverse to the front surfaces thereof encounters the light absorbing material on the sides of the strips.

References Cited by the Examiner

UNITED STATES PATENTS

| | | | |
|---|---|---|---|
| 1,535,985 | 4/25 | Clark | 88—28.9 |
| 1,882,829 | 10/32 | Hall | 88—28.9 |
| 1,883,290 | 10/32 | Ives | 88—16.6 |
| 1,970,311 | 8/34 | Ives | 88—16.6 |
| 2,018,592 | 10/35 | Arnulf | 88—16.6 |
| 2,150,225 | 3/39 | Kaszab | 88—28.93 |

JULIA E. COINER, *Primary Examiner.*